United States Patent [19]

Laube et al.

[11] Patent Number: 5,426,147
[45] Date of Patent: Jun. 20, 1995

[54] LOW PERMEABILITY RUBBER COMPOSITIONS

[75] Inventors: Stephen G. Laube, Duluth; David C. Novakoski, Alpharetta, both of Ga.

[73] Assignee: Cabot Corporation, Boston, Mass.

[21] Appl. No.: 237,618

[22] Filed: May 3, 1994

[51] Int. Cl.6 ................................................. C08K 3/00
[52] U.S. Cl. ..................................... 524/495; 524/496
[58] Field of Search .................................. 524/495, 496

[56] References Cited

U.S. PATENT DOCUMENTS 4,035,336  7/1977  Jordan et al. ........................ 524/495
5,229,452  7/1993  Green et al. ......................... 524/495

FOREIGN PATENT DOCUMENTS 9405732  3/1994  WIPO .

Primary Examiner—Paul R. Michl
Assistant Examiner—Edward J. Cain
Attorney, Agent, or Firm—Lawrence A. Chaletsky; Martha A. Finnegan

[57] ABSTRACT

Rubber compositions having reduced permeability to gases comprising rubber and specified furnace carbon blacks.

23 Claims, 1 Drawing Sheet

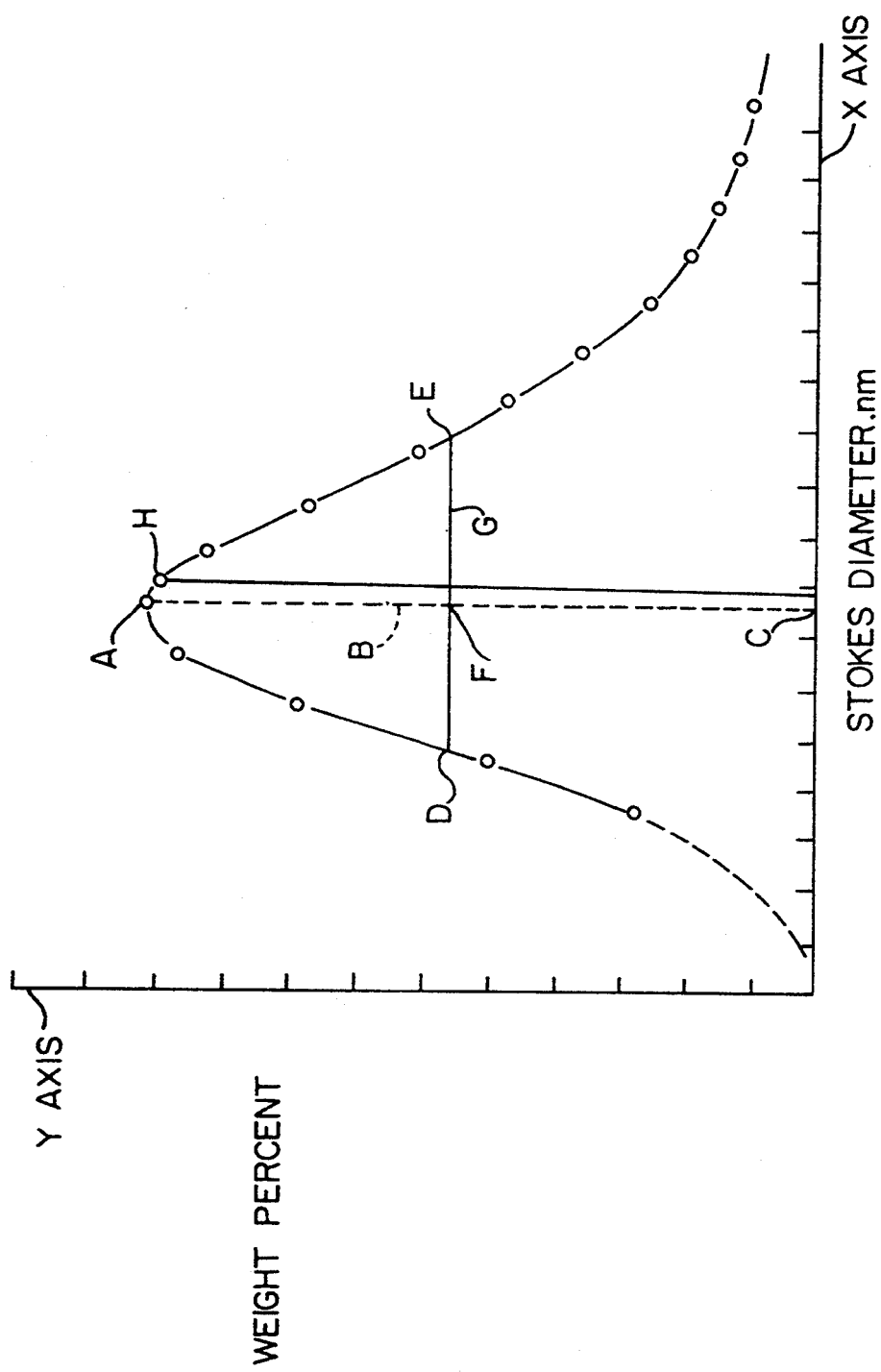

LOW PERMEABILITY RUBBER COMPOSITIONS

FIELD OF THE INVENTION

The present invention relates to low permeability rubber compositions. More particularly, the invention relates to compositions comprising rubbers and certain carbon blacks which provide the rubber composition with reduced permeability to gases.

BACKGROUND OF THE INVENTION

Rubber compositions having reduced permeability to air and other gases have utility in many applications, including pneumatic tire inner liners, tire inner tubes and curing bladders, and various other types of air bladders. A halobutyl elastomer, either alone or in combination with other synthetic and/or natural rubbers, is the most often utilized rubber, which together with a carbon black are the major components of low permeability rubber compositions.

With respect to inner liner compositions, it is known that carbon black not only reduces the air permeability of such compositions, but also affects other important inner liner performance characteristics such as, for example, adhesion of the inner liner to the reinforcing plies comprising the tire carcass, the heat resistance, flex resistance and compression set of the inner liner. There is, however, a maximum loading of the grades of carbon black conventionally used in formulating inner liner compositions, which if exceeded will adversely affect the inner liner. For example, two grades of furnace carbon blacks commonly used in formulating inner liner compositions, ASTM N660 and ASTM N772, are incorporated in amounts which generally do not exceed 60 parts by weight of black per 100 parts by weight of rubber.

U.S. Pat. No. 3,639,308 discloses an inner liner composition which exhibits satisfactory air permeability and which includes as much as 120 parts by weight of carbon black per 100 parts by weight of rubber. A disadvantage is that the composition incorporates thermal grade carbon blacks which are made by the not widely used thermal process.

PCT Patent Application No. WO 94/05732 discloses rubber compositions containing carbon blacks of the type disclosed in the present application. However, there is no disclosure of the use of these rubber compositions for reducing gas permeability.

SUMMARY OF THE INVENTION

We have discovered carbon black-containing rubber compositions which exhibit a combination of reduced permeability to gases and suitable physical properties. The compositions comprise a rubber and a specified furnace carbon black. The carbon blacks to be used in practicing the invention are selected from the following:

The carbon black component of the rubber composition is a furnace carbon black having an Iodine Number ($I_2$ No.) of from about 8 to about 32 milligrams per gram (mg/g), a DBP value (dibutyl phthalate absorption) of from about 28 to about 65 cubic centimeters per 100 grams (cc/100 g), and an M-ratio of from about equal to or greater than 1.25, and preferably from about equal to or greater than 1.25 to about 2.00.

Alternatively, the carbon black component of the rubber composition is a furnace carbon black having an $I_2$ No. of from about 12 to about 20 mg/g and a DBP value of from about 28 to about 65 cc/100 g, preferably from about 34 to about 65 cc/100 g.

According to another alternative, the carbon black component of the rubber composition is a furnace carbon black having an $I_2$ No. of from about 12 to about 18 mg/g and a DBP value of from about 28 to about 33 cc/100 g.

The rubber component of the inner liner composition of the present invention may be any natural or synthetic rubber, or mixtures of these rubbers and their derivatives. Rubber compounds found to have particular utility include: halobutyl rubbers, butyl rubbers, halogenated rubber, copolymers of from about 10 to 70 percent by weight of styrene and from about 90 to about 30 percent by weight of butadiene, such as a copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; copolymers of isobutylene-isoprene including halogenated types; and polymers and copolymers of conjugated dienes such as polybutadiene, polyisoprene, and polychloroprene.

The rubber composition generally comprises from about 20 to about 200 parts by weight of carbon black for each 100 parts by weight of rubber. It is, however, preferred to use from about 60 to about 175 parts by weight of carbon black per 100 parts by weight of rubber, and especially preferred is a composition comprising from about 80 to 150 parts of carbon black per 100 parts of rubber.

The method of mixing the components comprising the rubber composition is not critical. Any conventional method of mixing may be employed. In the present case, the mixing was performed in a Banbury mixer (2500 cc volume) utilizing the following procedure. Carbon black, rubber polymer and stearic acid were added to the mixer in the requisite amounts and mixed at 280° F. After mixing for 2 minutes, processing oil was added. The mixture was then removed from the mixer and fed onto a two roll mill to be formed into a sheet. After 0.5 minutes, MgO, ZnO, MBTS and sulfur were added to the sheet in the requisite amounts. After 5 minutes, the sheet was removed from the mill.

BRIEF DESCRIPTION OF THE DRAWING

FIG. 1 is a sample histogram of the weight fraction of the aggregates of a carbon black sample versus the Stokes diameter in a given sample.

DETAILED DESCRIPTION OF THE INVENTION

The present invention provides rubber compositions having a combination of reduced permeability to gases and requisite physical properties comprising rubber and a specified furnace carbon black. The furnace carbon black is selected from the following:

The carbon black component of the rubber composition may be a furnace carbon black having an $I_2$ No, of from about 8 to about 32 mg/g, a DBP value of from about 28 to about 65 cc/100 g, and an M-ratio of from about equal to or greater than 1.25. Furnace carbon blacks characterized by an M-ratio of from about equal to or greater than 1.25 to about 2.00, an $I_2$ No. of from about 12 to about 20 mg/g and a DBP of from about 34 to about 65 cc/100 g have been found to be particularly suitable for practicing the invention. Of these, carbon blacks having an $I_2$ No, of from about 14 to about 18 mg/g and a DBP of from about 36 to about 55 cc/100 g, and in particular from about 36 to about 42 cc/100 g and from about 45 to about 55 cc/100 g, are the most preferred. Other furnace carbon blacks having an M-ratio of from about 1.25 to about 2.00 which have also been found to be particularly suitable for practicing the invention are those having an $I_2$ No. of from about 12 to about 18 mg/g, preferably about 15 mg/g, and a DBP of from about 28 to about 33 cc/100 g.

The carbon black component of the rubber composition may also be selected from furnace carbon blacks having an $I_2$ No. of from about 12 to about 20 mg/g and a DBP of from about 28 to about 65 cc/100 g, preferably from about 34 to about 65 cc/100 g. Furnace carbon blacks having an $I_2$ No. of from about 14 to about 18 mg/g and a DBP of from about 36 to about 55 cc/100 g, and in particular from about 36 to about 42 cc/100 g and from about 45 to about 55 cc/100 g, are the most preferred.

In addition, the carbon black component of the rubber composition may be selected from furnace carbon blacks having an $I_2$ No. of from about 12 to about 18 mg/g, preferably about 15 mg/g, and a DBP of from about 28 to about 33 cc/100 g.

The following test procedures were used to determine the analytical properties of the carbon blacks disclosed herein.

The CTAB value of the carbon blacks was determined according to ASTM Test Procedure D3765-85. The $I_2$ No. of the blacks was determined according to ASTM D1510. The CDBP value of pellets formed from the carbon blacks was determined according to the procedure set forth in ASTM D3493-86. The DBP value of the carbon black pellets was determined according to the procedure set forth in ASTM D2414. The tint was determined according to the procedure set forth in ASTM D3265.

Dmode and D Stokes of the carbon blacks were determined from a histogram of the weight fraction of carbon black versus the Stokes diameter of the carbon black aggregates, as shown in FIG. 1. The data used to generate the histogram are determined by the use of a disk centrifuge such as the one manufactured by Joyce Loebl Co. Ltd. of Tyne and Wear, United Kingdom. The following procedure is a modification of the procedure described in the instruction manual of the Joyce Loebl disk centrifuge file reference DCF 4.008 published on Feb. 1, 1985, the teachings of which are hereby incorporated by reference, and was used in determining the data.

The procedure is as follows: 10 mg (milligrams) of a carbon black sample are weighed, then added to 50 cc of a solution of 10% absolute ethanol and 90% distilled water which is made with 0.05% NONIDET P-40 surfactant (NONIDET P-40 is a registered trademark for a surfactant manufactured and sold by Shell Chemical Co.). The resulting suspension is dispersed by means of ultrasonic energy for 15 minutes using Sonifier Model No. W 385, manufactured and sold by Heat Systems Ultrasonics Inc., Farmingdale, N.Y.

Prior to the disk centrifuge run the following data are entered into the computer which records the data from the disk centrifuge:

1. The specific gravity of carbon black, taken as 1.86 g/cc;
2. The volume of the solution of the carbon black dispersed in a solution of water and ethanol, which in this instance is 0.5 cc.;
3. The volume of spin fluid, which in this instance is 10 cc of water;
4. The viscosity of the spin fluid, which in this instance is taken as 0.933 centipoise at 23 degrees C;
5. The density of the spin fluid, which in this instance is 0.9975 g/cc at 23 degrees C;
6. The disk speed, which in this instance is 8000 rpm;
7. The data sampling interval, which in this instance is 1 second.

The disk centrifuge is operated at 8000 rpm while the stroboscope is operating. 10 cc of distilled water are injected into the spinning disk as the spin fluid. The turbidity level is set to 0; and 1 cc of the solution of 10% absolute ethanol and 90% distilled water is injected as a buffer liquid. The cut and boost buttons of the disk centrifuge are then operated to produce a smooth concentration gradient between the spin fluid and the buffer liquid and the gradient is monitored visually. When the gradient becomes smooth such that there is no distinguishable boundary between the two fluids, 0.5 cc of the dispersed carbon black in aqueous ethanol solution is injected into the spinning disk and data collection is started immediately. If streaming occurs the run is aborted. The disk is spun for 20 minutes following the injection of the dispersed carbon black in aqueous ethanol solution. Following the 20 minutes of spinning, the disk is stopped, the temperature of the spin fluid is measured, and the average of the temperature of the spin fluid measured at the beginning of the run and the temperature of the spin fluid measured at the end of the run is entered into the computer which records the data from the disk centrifuge. The data is analyzed according to the standard Stokes equation and is presented using the following definitions.

Carbon black aggregate—A discrete, rigid colloidal entity that is the smallest dispersible unit. It is composed of extensively coalesced particles.

Stokes diameter—The diameter of a sphere which sediments in a viscous medium in a centrifugal or gravitational field according to the Stokes equation. A non-spherical object, such as a carbon black aggregate, may also be represented in terms of the Stokes diameter if it is considered as behaving as a smooth, rigid sphere of the same density and rate of sedimentation as the non-spherical object. The customary units are expressed in nanometer diameters.

Mode (Dmode for reporting purposes)—The Stokes diameter at the point of the peak (Point A of FIG. 1 herein) of the distribution curve of Stokes diameter.

Median Stokes diameter-(Dst for reporting purposes-)—The point on the distribution curve of Stokes diameter where 50% by weight of the sample is either larger or smaller (Point H of FIG. 1 herein). It therefore represents the median value of the determination.

M-ratio is defined as the median Stokes diameter (Dst) divided by the mode (Dmode).

Table 1 sets forth the analytical properties of the carbon blacks of Examples 1-6. Examples 1-3 are furnace carbon blacks of the present invention. Example 4 (ASTM N772) and Example 5 (ASTM N660) are conventional furnace carbon black controls. Example 6 (ASTM N990) is a conventional thermal carbon black control.

TABLE 1

CARBON BLACK ANALYTICAL PROPERTIES

| Example | 1* | 2* | 3* | 4* (N772) | 5* (N660) | 6* (N990) |
|---|---|---|---|---|---|---|
| I₂ No. (mg/g) | 16.5 | 22.2 | 27.6 | 30.0 | 36.0 | 10.0 |
| CTAB (m²/g) | 17.3 | 22.6 | 27.6 | 33.0 | 38.0 | 10.0 |
| DBPA (cc/100 g) | 39.1 | 47.3 | 29.1 | 64.0 | 90.0 | 38.0 |
| CDBPA (cc/100 g) | 39.9 | 42.2 | 29.8 | 58.0 | 75.0 | 36.0 |
| Tint (%) | 33.3 | 39.9 | 44.9 | 57.0 | 56.0 | 32.0 |
| Dmode (rum) | 275.6 | 227.2 | 220.0 | 168.0 | 193.0 | 381.0 |
| Dst (mm) | 443.6 | 313.6 | 277.0 | 204.0 | 207.0 | 430.0 |
| M-ratio | 1.61 | 1.38 | 1.26 | 1.23 | 1.05 | 1.13 |

*Examples 1-3 are carbon blacks of the present invention. Examples 4, 5 and 6 are, respectively, the control carbon blacks N772, N660 and N990.

The effectiveness and advantages of the present invention will be further illustrated by the rubber compositions set forth in Examples 7-15.

Table 2 states the formulations of Examples 7-15.

TABLE 2

FORMULATIONS

| Example Ingredient | 7 | 8 | 9 | 10 | 11 | 12 | 13 | 14 | 15 |
|---|---|---|---|---|---|---|---|---|---|
| | | | | Parts by Weight | | | | | |
| Bromobutyl Rubber | 100.0 | 100.0 | 100.0 | 100.0 | 100.0 | 100.0 | 100.0 | 100.0 | 100.0 |
| Carbon Black of Example No. | 1* | 1* | 2* | 2* | 3* | 3* | 4* | 5* | 6* |
| Carbon Black Loading | 90.0 | 100.0 | 90.0 | 100.0 | 90.0 | 100.0 | 60.0 | 60.0 | 100.0 |
| Processing Oil⁽¹⁾ | 8.0 | 8.0 | 8.0 | 8.0 | 8.0 | 8.0 | 8.0 | 8.0 | 8.0 |
| Stearic Acid | 2.0 | 2.0 | 2.0 | 2.0 | 2.0 | 2.0 | 2.0 | 2.0 | 2.0 |
| Zinc Oxide | 3.0 | 3.0 | 3.0 | 3.0 | 3.0 | 3.0 | 3.0 | 3.0 | 3.0 |
| Magnesium Oxide | 0.5 | 0.5 | 0.5 | 0.5 | 0.5 | 0.5 | 0.5 | 0.5 | 0.5 |
| MBTS⁽²⁾ | 1.5 | 1.5 | 1.5 | 1.5 | 1.5 | 1.5 | 1.5 | 1.5 | 1.5 |
| Sulfur | 0.5 | 0.5 | 0.5 | 0.5 | 0.5 | 0.5 | 0.5 | 0.5 | 0.5 |

*Carbon blacks 1—1, 2—2 and 3—3 are carbon blacks of the present invention. Carbon blacks 4, 5 and 6 are, respectively, the control carbon blacks N772, N660 and N990.
⁽¹⁾The processing oil utilized was FLEXON 876, a trademarked product produced and sold by EXXON Corporation.
⁽²⁾MBTS is mercaptobenzothiazoledisulfide.

The following test procedures were used to evaluate the physical properties of the rubber compositions of Examples 7-15.

The modulus, tensile, and elongation of the compositions were measured by the procedure set forth in ASTM D412. The Shore A Hardness of the compositions was determined according to the procedure set forth in ASTM D2240-86.

The Mooney viscosity of the compositions was determined by the procedure set forth in ASTM D1646, and the Mooney scorch of the compositions was determined by the procedure set forth in ASTM D1646. The Angle tear of the compositions was determined by the procedure set forth in ASTM D624. Rebound was determined in accordance with the procedure set forth in ASTM D-1054.

The adhesion of the compositions was measured in accordance with Cabot test procedure no. 1212, which includes the following:

1) A tear test procedure was used, utilizing a 1″×8″×0.5″ (2.54×20.32×1.27 cm) cured sample of rubber and carbon black.
2) The rubber/carbon black composition of the invention and a natural rubber/carbon black compound were plied up in a mold so that each stock formed a strip measuring approximately 1″×8″×0.25″ (2.54×20.32×0.64 cm).
3) A 2.5″ (6.35 cm) piece of mylar paper was placed between the rubber/carbon black composition and the natural rubber/carbon black compound at one end of the mold to provide room to insert each leg of the sample in a clamp.
4) The strips were pulled on a Monsanto T-500 tensile tester using a crosshead speed of 2 inches per minute (5.1 cm per minute).
5) Results in lbs/in. (kN/m) of pull were plotted vs. jaw separation distance.
6) The measurements were taken as the mean peak value in lbs./in. (kN/m).
7) Two specimens were tested per carbon black grade and the average of the two were reported.

The thermal conductivity of the compositions was determined using the procedure outlined in Rubber Chemistry and Technology Vol.42, No.5, pp. 1314-1320, December, 1969. The units used are (Btu/sq.ft.)(hr.)(F°/sq.ft.)

Table 3 describes the physical properties of each of the Examples 7-15.

TABLE 3

RUBBER COMPOSITIONS

| EXAMPLE | 7* | 8* | 9* | 10* | 11* | 12* | 13* | 14* | 15* |
|---|---|---|---|---|---|---|---|---|---|
| Mooney Viscosity ML4 @ 100 C. | 74.2 | 77.2 | 73.3 | 74.8 | 65.5 | 68.4 | 66.9 | 71.7 | 61.3 |
| Mooney Scorch (min.) MS @ 135 C. | 20.4 | 21.0 | 19.1 | 20.7 | 20.2 | 18.0 | 23.5 | 23.0 | 25.5 |
| Tensile Strength (Mpa) | 9.8 | 10.1 | 10.0 | 10.0 | 9.9 | 10.0 | 11.9 | 12.8 | 6.7 |
| 300% Modulus (Mpa) | 8.0 | 9.4 | 8.0 | 8.7 | 6.7 | 7.6 | 6.5 | 8.9 | 5.2 |
| Elongation (%) | 473.0 | 399.0 | 467.0 | 433.0 | 503.0 | 459.0 | 572.0 | 523.0 | 610.0 |
| Angle Tear (kN/m) | 34.1 | 36.1 | 36.4 | 36.8 | 32.9 | 35.7 | 38.7 | 39.4 | 31.3 |
| Rebound (% RE) | 31.4 | 31.4 | 31.2 | 30.8 | 31.8 | 31.2 | 32.4 | 31.6 | 33.5 |
| Hardness (Shore A2) | 57.0 | 60.0 | 56.0 | 58.0 | 54.0 | 58.0 | 51.0 | 57.0 | 57.0 |
| Thermal Conductivity (BTU/sq.ft.(hr)F.°/sq.ft.) | 0.1272 | 0.1349 | 0.1245 | 0.1338 | 0.1197 | 0.1234 | 0.1101 | 0.1148 | 0.133 |
| Adhesion (kN/m) | 9.9 | 6.7 | 9.9 | 9.0 | 15.1 | 11.2 | 14.4 | 10.5 | 16.8 |

TABLE 3-continued

| EXAMPLE | RUBBER COMPOSITIONS | | | | | | | |
|---|---|---|---|---|---|---|---|---|
| | 7* | 8* | 9* | 10* | 11* | 12* | 13* | 14* | 15* |
| Air Permeability | 1.763 | 1.554 | 1.713 | 1.819 | 1.769 | 1.763 | 2.08 | 1.946 | 1.734 |

*Examples 7–12 are rubber compositions of the present invention. Examples 13, 14 and 15 are rubber compositions containing, respectively, the control carbon blacks N772, N660 and N990.

The results set forth in Table 3 show that the rubber compositions of Examples 7–12 utilizing the carbon blacks of the present invention exhibit reduced gas permeability as compared with rubber compositions of Examples 13 and 14 utilizing the control furnace carbon blacks ASTM N772 and ASTM N660. The Table 3 data further show that the rubber compositions of the present invention may contain higher loadings of carbon black when compared to compositions utilizing the conventional furnace carbon blacks N772 and N660. The results also indicate that rubber compositions prepared with the furnace carbon blacks of the present invention exhibit physical properties comparable with those possessed by the rubber compositions incorporating the control furnace blacks. The results further indicate that rubber compositions utilizing the furnace blacks of the invention exhibit higher thermal conductivity than rubber compositions incorporating the control furnace blacks. Thermal conductivity is a particularly important property where the composition is to be used in a tire curing bladder application.

With respect to the ASTM N990 thermal black control utilized in the rubber composition of Example 15, the results set forth in Table 3 show that the furnace blacks of the present invention can be incorporated into rubber compositions at comparable loading levels. Table 3 also shows that not only do the rubber compositions prepared with the furnace blacks of the invention exhibit gas permeability comparable with the rubber composition incorporating the thermal black, but also that utilization of the furnace blacks of the invention impart to the rubber composition superior physical properties, such as Mooney viscosity, tensile strength, modulus and angle tear resistance. Moreover, the results indicate that the thermal conductivity of rubber compositions prepared with the furnace blacks of the present invention is comparable with the thermal conductivity of the rubber composition incorporating the thermal black control.

It should be clearly understood that the forms of the invention herein described are illustrative only and are not intended to limit the scope of the invention. The present invention includes all modifications falling within the scope of the following claims.

We claim:

1. A process for preparing a rubber article having reduced gas permeability comprising incorporating within the rubber article a liner comprising a rubber and a furnace carbon black having an $I_2$ No. of from about 12 to about 20 mg/g and a DBP value of from about 28 to about 65 cc/100 g.

2. The process of claim 1 further characterized in that the carbon black has an $I_2$ No. of from about 12 to about 20 mg/g and a DBP value of from about 34 to about 65 cc/100 g.

3. The process of claim 1 further characterized in that the carbon black has an $I_2$ No. of from about 14 to about 18 mg/g and a DBP value of from about 36 to about 55 cc/100 g.

4. The process of claim 1 further characterized in that the carbon black has an $I_2$ No. of from about 14 to about 18 mg/g and a DBP value of from about 36 to about 42 cc/100 g.

5. The process of claim 1 further characterized in that the carbon black has an $I_2$ No. of from about 14 to about 18 mg/g and a DBP value of from about 45 to about 55 cc/100 g.

6. The process of claim 1 further characterized in that the carbon black has an $I_2$ No. of from about 12 to about 18 mg/g and a DBP value of from about 28 to about 33 cc/100 g.

7. The process of claim 1 further characterized in that the carbon black has an $I_2$ No. of about 15 mg/g and a DBP value of from about 28 to about 33 cc/100 g.

8. The process of claim 1 wherein the rubber article is an inner liner.

9. The process of claim 1 wherein the rubber article is an inner tube.

10. The process of claim 1 wherein the rubber article is a curing bladder.

11. The process of claim 1 wherein the rubber article is an air bladder.

12. A process for preparing a rubber article having reduced gas permeability comprising incorporating within the rubber article a liner comprising a rubber and a furnace carbon black having an $I_2$ No. of from about 8 to about 32 mg/g, a DBP value of from about 28 to about 65 cc/100 gram, and an M-ratio of from about equal to or greater than 1.25.

13. The process of claim 12 further characterized in that the carbon black has an $I_2$ No. of from about 8 to about 32 mg/g, a DBP value of from about 28 to about 65 cc/100 g, and an M-ratio of from about equal to or greater than 1.25 to about 2.00.

14. The process of claim 12 further characterized in that the carbon black has an $I_2$ No. of from about 12 to about 20 mg/g and a DBP value of from about 34 to about 65 cc/100 g.

15. The process of claim 12 further characterized in that the carbon black has an $I_2$ No. of from about 14 to about 18 mg/g and a DBP value of from about 36 to about 55 cc/100 g.

16. The process of claim 12 further characterized in that the carbon black has an $I_2$ No. of from about 14 to about 18 mg/g and a DBP value of from about 36 to about 42 cc/100 g.

17. The process of claim 12 further characterized in that the carbon black has an $I_2$ No. of from about 14 to about 18 mg/g and a DBP value of from about 45 to about 55 cc/100 g.

18. The process of claim 12 further characterized in that the carbon black has an $I_2$ No. of from about 12 to about 18 mg/g and a DBP value of from about 28 to about 33 cc/100 g.

19. The process of claim 12 further characterized in that the carbon black has an $I_2$ No. of about 15 mg/g and a DBP value of from about 28 to about 33 cc/100 g.

20. The process of claim 12 wherein the rubber article is an inner liner.

21. The process of claim 12 wherein the rubber article is an inner tube.

22. The process of claim 12 wherein the rubber article is a curing bladder.

23. The process of claim 12 wherein the rubber article is an air bladder.

* * * * *